Patented Oct. 12, 1948

2,450,902

UNITED STATES PATENT OFFICE 2,450,902

DECORATION OF GLASS FABRICS

Carl M. Marberg, Elmhurst, Long Island, N. Y., assignor to Interchemical Corporation, New York, N. Y., a corporation of Ohio No Drawing. Application October 18, 1941, Serial No. 415,625

5 Claims. (Cl. 260—29.4)

This invention relates to the coloring of textiles made from glass fibers, and to compositions useful in the coloring thereof. Specifically, it refers to the production of wash- and drycleaning-fast colorings on textiles by the use of pigmented dye-baths and printing pastes, characterized by the presence therein of an interpolymer of polyvinyl chloride and polyvinyl acetate, together with a resin of the carbamide-formaldehyde type.

The coloring of textiles made from glass fibers, or the coloring of the fiber itself, has been a most difficult problem. Conventional dyeing techniques cannot be used; conventional direct dyes have no affinity for the glass, and ingrain dyes cannot be used because of the fact that the fibers are non-absorptive. It is possible to get a color effect by applying mordants which adhere to the cloth, and then dyeing the mordants; but the color is easily removed, either by washing or mere dry rubbing. Two methods, neither of them very satisfactory, can be used. In the one method, the glass itself may be ceramically colored; only very light tints can be obtained by this method. In the second method, ordinary coating lacquers have been applied by silk screen application. These lacquers give a considerable undesirable added "hand" (harshness of feel) to the fabrics, which already have too much hand because of the nature of the fabric. Furthermore, the "dyeings" are not sufficiently fast to washing and dry cleaning.

I have discovered that glass may be colored successfully to yield dyeings and prints which are wash-fast, drycleaning-fast and substantially free of undesirable added hand, by using compositions comprising pigments dispersed in binders consisting essentially of interpolymers of vinyl chloride and vinyl acetate, together with a heat-convertible synthetic resin of the carbamide-formaldehyde type.

Preferably, my compositions are applied to the glass textile in the form of water-in-lacquer emulsions of the type described in the Jenett U. S. Patent No. 2,222,581, issued November 19, 1940. In Jenett's emulsions a rather thin lacquer is thickened to printing consistency by the emulsification of a discontinuous water phase comprising at least 20% of the total emulsion by weight, and the emulsions preferably contain at least 2 volumes of binder for each volume of pigment to minimize crocking. My compositions may be considered as an improvement on the compositions disclosed in said Jenett patent, in that my compositions yield prints on glass which adhere and are wash-fast, whereas the Jenett compositions lack the necessary adhesion to glass.

This type of emulsion paste, while intended primarily for printing, may be used for dyeing by immersing the cloth in the emulsion paste, and forcing the paste through the cloth by mechanical or other action. When so used, the resin-pigment complex does not saturate the fabric, but, on microscopic examination, is found as isolated islands spaced in such fashion that a full color effect is given to the unaided eye. Hence, the fabric remains completely pervious to washing, its flexibility is not decreased, and the fibers are not matted together as in ordinary impregnation.

Typical examples of my invention are the following:

Example 1

A stock solution is made by dissolving—

40 grams Vinylite VYHH (Carbide and Carbon Chemicals Corporation)—Interpolymer of 87 vinyl chloride, 13 vinyl acetate, in 40 grams Isophorone 80 grams Toluene.

To this stock solution are added—

40 grams Urea formaldehyde resin (50% solution in 30 butanol, 20 xylene)

264 grams Solvesso #2

Then—

80 grams of a 20% phthalocyanine green neutral aqueous pulp are stirred in, followed by 256 grams Water.

The mass is mixed, and the resultant 800 grams of water-in-lacquer emulsion is passed through a colloid mill. The finished product has excellent printing body. It may be printed on glass fabric, or forced through the fabric by mechanical means to give overall dyeings. When the composition is set by subjecting the decorated textile to 300° F. for five minutes, the colors are wash-fast, drycleaning-fast, and have added little appreciable hand to the fabric.

Example 2

10 grams vinyl acetate-vinyl chloride interpolymer are dissolved in—

10 grams Isophorone 20 grams Toluene

Then add—

5 grams Solvent-soluble melamine-formaldehyde resin in 3 grams Butanol and 2 grams Xylene Add 52 grams Solvesso #2

Mix thoroughly. Add slowly—

14 grams Copper phthalocyanine (22% aqueous dispersion) and 69 grams Water

Mix thoroughly and pass through a colloid mill set at .002" clearance. The water-in-lacquer emulsion paste is then applied using a conventional textile printing press, and gives results similar to those in Example 1.

*Example 3*

10 grams vinyl acetate-vinyl chloride interpolymer are dissolved in—
10 grams Isophorone and
20 grams Toluene
  Then add—
5 grams Urea formaldehyde resin, dissolved in
3 grams Butanol and
2 grams Xylene
  Add to this mixture—
15 grams White pine oil and
51 grams Solvesso #2
  Stir thoroughly, and add while stirring—
20 grams Red pulp (India Red X1975—Imperial Color) 20% aqueous slurry, and
64 grams Water Stir thoroughly, and pass through a colloid mill at .002" clearance.

This gives satisfactory prints of good adhesion.

*Example 4*

10 grams vinyl acetate-vinyl chloride interpolymer are dissolved in—
10 grams Isophorone and
20 grams Toluene
  To this solution are added—
5 grams Urea formaldehyde resin, dissolved in
3 grams Butanol and
2 grams Xylene
  Add to this mixture—
15 grams White pine oil and
51 grams Solvesso #2
  Then add while stirring—
29 grams Yellow (14% pulp) (dichlorobenzidine yellow) and
55 grams Water Stir well, and pass through a colloid mill set at .002" clearance.

Applied to fabric as in Example 1.

*Example 5*

13.50 grams vinyl acetate-vinyl chloride interpolymer are dissolved in—
13.50 grams Isophorone and
27.00 grams Toluene
  To this solution add—
1.60 grams Urea formaldehyde resin, dissolved in—
0.96 gram Butanol and
0.64 gram Xylene
  Then add
49.80 grams Solvesso #2
  Stir, and add slowly—
14.00 grams Copper phthalocyanine (22% aqueous slurry) and
69.00 grams Water Stir thoroughly, and pass through a colloid mill with a clearance of .002".

In spite of the low ratio of urea resin employed here, fairly good wash-fastness is obtained.

Examples can of course be multiplied indefinitely, without departing from the scope of my invention.

Various interpolymers of a major proportion of vinyl chloride and a minor proportion of vinyl acetate can be used. The carbamide formaldehyde resins used should preferably be of the solvent-soluble type, in order to get compatibility with the ordinary copolymers, although the hydrophile type provides some protection against washing. As indicated by the examples, melamine-formaldehyde resins can be used in place of the carbamide-formaldehyde or urea-formaldehyde resins; and resins made from formaldehyde and biuret, guanidine or dicyanodiamide can also be utilized for the present purpose.

While the vinyl resin without the carbamide resin gives good adhesion, substantially improved wash-fastness is obtained with small quantities of carbamide resin, of the order of 10% of the vinyl resin. Similar quantities of vinyl resin, added to urea resin, give improved adhesion to the urea resin. Optimum results are obtained between the ratios of 3 vinyl to 1 urea and 1 vinyl to 1 urea resin, although these ratios do not in any way limit the scope of this invention.

I claim:

1. A composition adapted for application to glass fabrics comprising pigment dispersed in a vehicle comprising a solution of a heat-convertible resin prepared from formaldehyde and a substance selected from the group consisting of carbamide, melamine, biuret, guanidine and dicyanodiamide, and a vinyl chloride-vinyl acetate interpolymer in which the vinyl chloride forms the major portion, the vinyl chloride-vinyl acetate interpolymer comprising at least 50% of the pigment binder in the composition and the heat-convertible resin comprising at least about 10% of the weight of the vinyl interpolymer.

2. A composition adapted for application to glass fabrics comprising pigment dispersed in a vehicle comprising a solution of a heat convertible resin prepared from formaldehyde and a substance selected from the group consisting of carbamide, melamine, biuret, guanidine and dicyanodiamide, and a vinyl chloride-vinyl acetate interpolymer in which the vinyl chloride forms the major portion, having emulsified therein an inner aqueous phase comprising at least 20% of the composition by weight, the vinyl chloride-vinyl acetate interpolymer comprising at least 50% of the pigment binder in the composition and the heat-convertible resin comprising at least about 10% of the weight of the vinyl interpolymer.

3. A composition adapted for application to glass fabrics comprising pigment dispersed in a vehicle comprising a solution of a heat convertible resin prepared from formaldehyde and a substance selected from the group consisting of carbamide, melamine, biuret, guanidine and dicyanodiamide, and a vinyl chloride-vinyl acetate interpolymer in which the vinyl chloride forms the major portion, having emulsified therein an inner aqueous phase comprising at least 20% of the composition by weight, the ratio of the heat-convertible resin to the vinyl interpolymer being between 1 to 3 and 1 to 1.

4. A glass fabric carrying a pigmented decoration comprising pigment bound to the fabric with a binder comprising a heat-converted resin prepared from formaldehyde and a substance selected from the group consisting of carbamide, melamine, biuret, guanidine and dicyanodiamide, and a vinyl chloride-vinyl acetate interpolymer in which the vinyl chloride forms the major portion, the vinyl chloride-vinyl acetate interpolymer comprising at least 50% of the pigment binder and the heat-converted resin comprising at least about 10% of the weight of the vinyl interpolymer.

5. A glass fabric carrying a pigmented decoration comprising pigment bound to the fabric with a binder comprising a heat-converted resin prepared from formaldehyde and a substance selected from the group consisting of carbamide, melamine, biuret, guanidine and dicyanodiamide, and a vinyl chloride-vinyl acetate interpolymer in which the vinyl chloride forms the major portion, the ratio of the heat-converted resin to the vinyl interpolymer being between 1 to 3 and 1 to 1.

CARL M. MARBERG.

REFERENCES CITED

The following references are of record in the file of this patent:

UNITED STATES PATENTS

| Number | Name | Date |
|---|---|---|
| 1,935,577 | Reid | Nov. 14, 1933 |
| 2,222,581 | Jenett | Nov. 19, 1940 |